United States Patent

Bratten

[11] Patent Number: 5,290,458
[45] Date of Patent: Mar. 1, 1994

[54] GRANULAR MEDIA REGENERATION PROCESS

[76] Inventor: Jack R. Bratten, 5970 St. James Dr., West Bloomfield, Mich. 48322

[21] Appl. No.: 936,290

[22] Filed: Nov. 30, 1992

Related U.S. Application Data

[62] Division of Ser. No. 718,988, Jun. 21, 1991, Pat. No. 5,171,443.

[51] Int. Cl.$^5$ ............................................. B01D 24/46
[52] U.S. Cl. ................................. 210/796; 210/670; 210/677; 210/780; 210/792
[58] Field of Search ............... 210/670, 677, 792, 796, 210/780, 786, 784

[56] References Cited

U.S. PATENT DOCUMENTS

| | | | |
|---|---|---|---|
| 379,349 | 3/1888 | Warren | 210/792 |
| 3,412,863 | 11/1968 | Stuart, Sr. | 210/796 |
| 3,557,955 | 1/1971 | Hirs | 210/796 |
| 4,496,464 | 1/1985 | Hensley | 210/792 |

*Primary Examiner*—Robert A. Dawson
*Assistant Examiner*—Sun Uk Kim
*Attorney, Agent, or Firm*—John R. Benefiel

[57] ABSTRACT

Regeneration of a granular media is produced by mechanically forming a slurry of the media in a liquid and separation of the liquid from the granular media by rapidly rotating a separator element having small openings through the slurry, as flow of a liquid granule slurry is drawn out through the openings, the movement producing a scrubbing action keeping the openings clear of the granules.

12 Claims, 2 Drawing Sheets

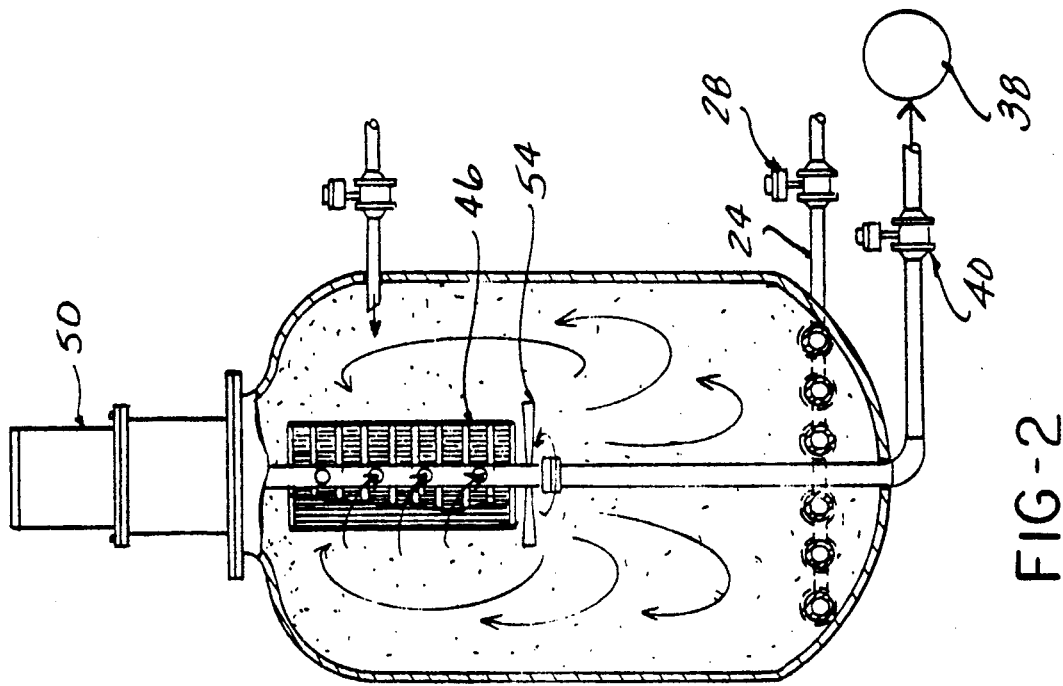
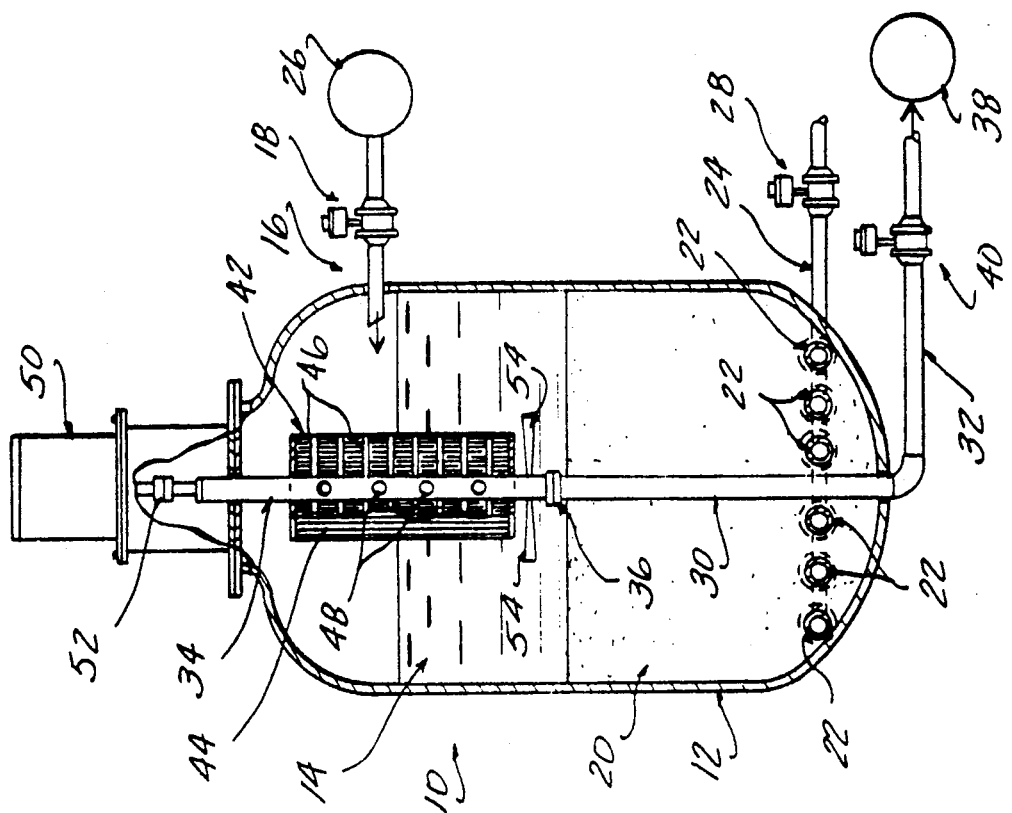

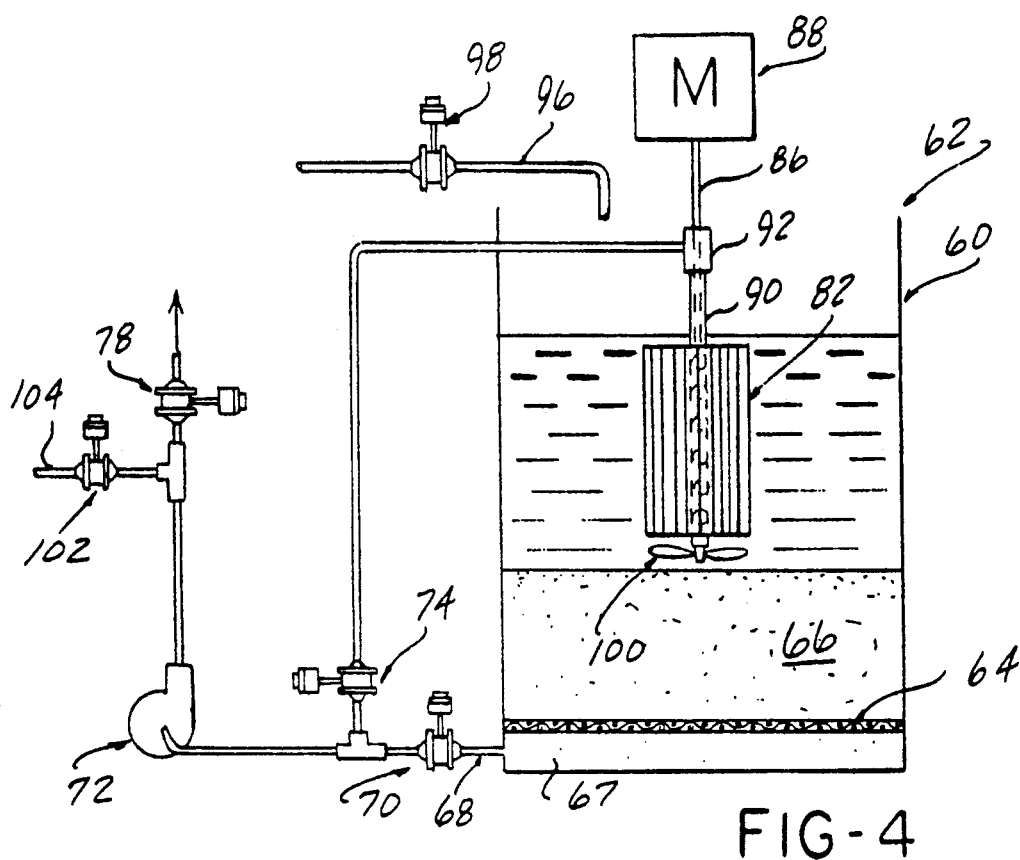
FIG-4
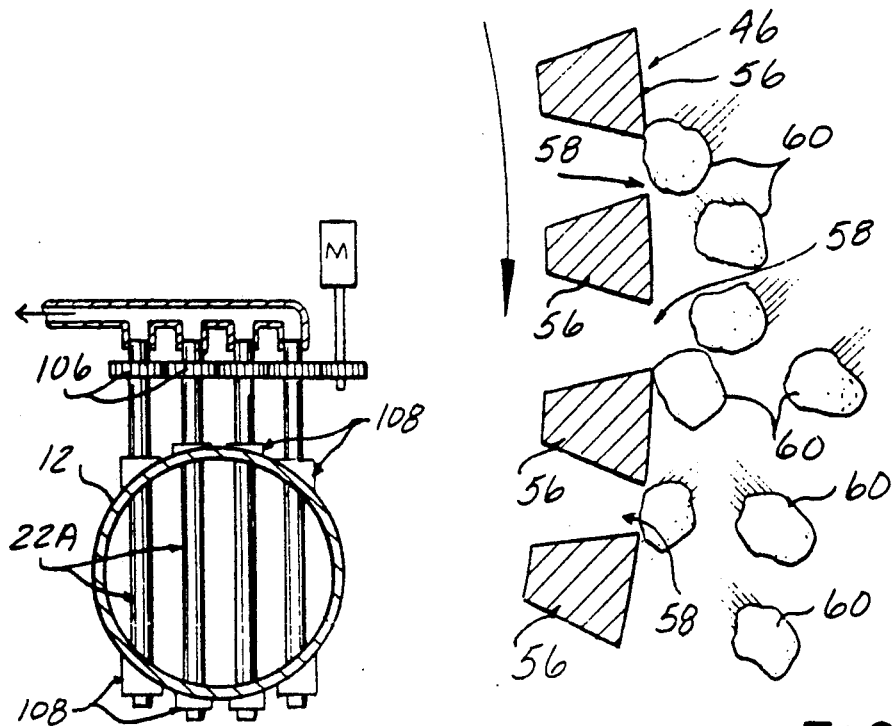
FIG-5
FIG-3

GRANULAR MEDIA REGENERATION PROCESS

CROSS REFERENCE TO RELATED APPLICATION

This is a division of U.S. Ser. No. 07/718,988 filed on Jun. 21, 1991 now U.S. Pat. No. 5,171,443.

This invention concerns an apparatus and process for treating a liquid, such as filtering or deionizing, involving the use of a granular media disposed in a tank.

Such apparatus has long been employed in filtering or deionizing in which liquid flow is directed through a bed of granular media such as said or resin beads either for the purpose of filtering contaminants from the liquid, or for deionizing the liquid, as in water softening.

In the case of filters, there is a need to periodically regenerate the media as the filtered material gradually accumulates in the bed to clog the filtering flow. Regeneration is typically accomplished by directing a backwashing flow into the bed and carrying off the contaminants in the backwash. There has heretofore been employed relatively light weight, larger sized media comprised of crushed shells, particularly black walnut shells, which are extremely hard and durable. This type of media has been found to be very effective in removing oily contaminants while allowing the contaminants to be subsequently removed during regeneration.

For these lighter weight media, a very effective regeneration process has previously been devised, as described in detail in U.S. Pat. No. 3,550,774. In this process, the media and a quantity of liquid are mixed into a slurry, and the slurry pumped past a tubular perforate separating element at a substantial flow velocity. The openings in the separating element are sized to be smaller than the media granules, so that only the relatively finer contaminants are drawn out with the liquid flowing through the separating element.

It has been found that the high velocity of the flow over the separating element keeps the media granules from collecting in the flow openings, thus allowing the separating process to proceed for a sufficiently long time period so that a substantial proportion of the contaminants is removed.

Variations of this process are described in U.S. Pat. Nos. 4,496,464; 4,826,608; and 4,787,987. While highly successful, there are a number of drawbacks in the way this process has been implemented.

Firstly, a high output pump must be used to create the slurry and circulate the same past the separator element at high velocity, and this requires considerable horsepower, hence increasing the cost of the apparatus and of operation.

The valves and other plumbing required for the separate circulation system also adds to the complexity and cost of fabrication of the system, particularly for an external location of the separator element.

Secondly, flow of the slurry through the pump at high velocity causes rapid wearing away of the granules as the granules pass through the tight pump clearance spaces, even when using very hard granules such as black walnut shells. This results in excessive rates of replacement of the media and prevents the use of lower cost softer media such as plastic beads.

Thirdly, limitations in reaching high flow rates through the separator are imposed by the need to avoid clogging of the separator openings with media granules, since the clearing effects of high velocity flow remain effective only if the outflow rates remain moderate. The low to moderate draw off rates are below that of normal inflow of liquid to be filtered, so that the filter goes off line to some extent during the regeneration cycle.

Fourthly, the need to have a pumpable slurry means a fairly dilute concentration of contaminants is present, taking a longer time to reduce the concentration to an acceptable level.

Finally, the need to circulate the slurry means that this regeneration technique is limited to pressurized systems, and is not usable in gravity filters.

U.S. Pat. Nos. 4,970,004; 4,741,841; 4,876,013; and 3,617,543 describe complex systems for inducing movements tending to reduce build up on screen filters, but this approach has not be heretofore employed with granular media regeneration.

In the case of deionizers, these systems could benefit from an improved regeneration system, since backwash rates are limited to an outflow which will not cause outflow of the resin bead granular media or blockage of the outlet by the resin beads. Also, contamination of the media granules is difficult to eliminate due to the inability to strongly backwash the resin beads. A complex recirculation regeneration system as described above would add excessive costs to such system.

SUMMARY OF THE INVENTION

The present invention comprises apparatus and a process for regeneration a granular filter media used in treatment of the liquid such as in filtering or deionizing water. The invention contemplates the formation of liquid granule slurry, and utilizes a separator element formed with flow openings sized to prevent the passage of media granules when liquid in the slurry is drawn out through the openings. The separator element is continuously rotated through the slurry at sufficiently high surface to velocity to maintain the openings clear of granules by the scouring effect achieved by impacting of the suspended granules in the slurry against granules which have found their way onto the separator element opening. This continuous rotary movement is conveniently achieved by rotation of a circularly shaped separator element such as a tube disposed in the slurry.

The slurry formation is preferably carried out by mechanical agitation of the liquid and media, advantageously executed by a series of blades or paddles rotated with the separator element to simultaneously produce the rotary motion of the separator element and agitator blades with a single drive motor.

The use of mechanical motion to produce the scrubbing or scouring action has the advantage of being much more efficient than the high velocity flow circulation previously employed, and enables high rates of liquid to be drawn off without clogging of the separator while simplifying the valving and other plumbing components.

When combined with mechanical agitation, a much more concentrated slurry can be dealt with, improving the speed of contaminant removal and greatly reducing the rate of degradation of the media allowing softer media granules to be employed. The invention is applicable to pressurized, vacuum, or gravity systems, and has application to other liquid treatment systems involving granular media, other than filtering, such as to deionizers, where it can be employed to allow high rates of flow during media regeneration.

DESCRIPTION OF THE DRAWINGS

FIG. 1 is a cross sectional view of a deep bed pressurized filter utilizing separator apparatus according to the present invention with related components depicted schematically, shown with the filter in operation.

FIG. 2 is a cross sectional view of the filter shown in FIG. 1 undergoing a regeneration cycle.

FIG. 3 is a greatly enlarged fragmentary sectional view taken through the separator element, illustrating the scrubbing effect achieved by rotation of the separator.

FIG. 4 is a cross section of a deep bed gravity filter using a separator apparatus according to the present invention.

FIG. 5 is a transverse view through a filter using an alternate form of the separator element.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIG. 1 shows a filter 10 including a closed tank 12 defining an interior space 14 adapted to receive a liquid to be filtered from an inlet 16 which may be controlled with a valve 18.

A mass of granular filter media when settled forms a filter bed 20 adapted to remove contaminants in the liquid as the liquid passes down through the filter bed 20. The filter media is preferably of a relatively light weight such as the crushed black walnut shells described above or plastic beads as will perform satisfactorily for the requirements of the particular application.

A series of outlet strainer pipes 22 in the lower region of the tank space 14 receive flow of purified liquid through slots or perforations in the pipes, this flow collected and directed out of the tank through an outlet 24. A circulation pump 26 and valve 28 control the circulation of liquid out from the tank space 14.

A well known alternative to the strainer pipes 22 is to provide a screen across the bottom of the tank, allowing collection of filtered liquid.

Separator apparatus according to the present invention is incorporated for the purpose of periodically regenerating the granular filter media to remove accumulated contaminants. This apparatus includes a central pipe 30 extending up from an outlet pipe 32 exiting at the bottom of the tank 12. A rotatable pipe 34 is fit by a coupling 36 to the upper end of the central pipe 30 so as to allow rotation while allowing flow from the rotatable pipe 34 into the central pipe 30 and subsequently into the outlet 32. A pump 38 enables withdrawal of liquid through the pipes 30, 32, 34, and valve 40 enables control over communication of the tank interior space 14 and the pipes 30, 32, 34.

The rotatable pipe 34 has affixed to its exterior a separator element comprised of a circularly shaped separator tube 42. The outer wall 44 of the separator tube 42 is formed with small flow openings sized to prevent the passage of filter media granules while allowing inflow of liquid and the finer contaminants. Typical granules sizes are on the order of 0.015-0.020 inches, ranging from 0.005 to 0.100 inches in diameter.

The gaps or holes should be slightly smaller to prevent escape of the granules driven regeneration.

These openings may be provided by side by side slightly spaced lengths of wedgewire welded to annular supports 46, to form lengthwise slots. Alternatively, a perforated layer may be employed.

The rotatable pipe 34 is formed with suitable large openings 48 enabling liquid passing into the interior of the separator tube 42 to freely flow out of the tank 12 through the pipes 30, 32.

The rotatable pipe 34 is adapted to be driven by drive means comprised of an electric motor 50 mounted above the tank 12, rotating the pipe 34 by a rotary coupling 52 when the motor 50 is energized.

Mechanical agitator means are also included, here taking the form of agitator elements comprised of paddles 54 attached to the rotatable pipe 34 so as to be rotated simultaneously with rotation of the separator tube 42. While shown downwardly facing, the paddles 54 could be directed upwardly, or in other directions.

FIG. 2 shows the conditions existing when the filter is undergoing regeneration of the filter media. Outflow of liquid to the outlet 24 has ceased, valve 28 having been closed.

Motor 50 is energized to rotate the separator tube 42 and agitator paddles 54. The speed of rotation should be sufficient to completely disperse the filter media granules into the liquid to form a slurry substantially covering and moving past the surface of the separator tube 42 as indicated in FIG. 2.

The pump 38 is activated after the valve 40 is opened, causing liquid to be withdrawn from the tank through the small opening in the separator tube 42.

The withdrawn liquid contains the relatively fine contaminants which are able to pass out through the small openings with the liquid, while the granules of filter media cannot.

Make up liquid may be introduced via inlet 16 as liquid is withdrawn through the separator tube 42 until the contaminant level is reduced as required. As discussed above, the scouring action may be sufficient so that make up flow equal to normal inlet flow may be achieved.

After regeneration is completed by reducing the contaminants to an acceptable level, rotation of the agitator paddles is stopped and the media bed 20 allowed to reform, to enable restarting of the filter operation.

FIG. 3 shows the scouring action accomplished by the rotation of the separator element 42. The surface 44 may be formed of slightly spaced apart wedgewire strips 56 forming narrow slots 58 (shown exaggerated in width). As noted above, the media granules 60 are of larger size than the slots 58 and so cannot pass through. The rotation of the surface 46 through the slurry produces a scouring action as the granules dispersed in the liquid impact those granules which have been attracted to the slots 58 by outflow of liquid withdrawn through the slots 58 A surface velocity on the order of 15 ft/sec has been found to keep the openings clear by the impacting action described, although lower and higher rates may be employed, depending on the draw off flow rate, the particular granules employed and other variables. The slots 58 preferably extend transversely to the direction of movement to maximize the scouring action.

FIG. 4 shows a similar separator arrangement incorporated in a non-pressurized tank 60 used in a gravity filter 62. A bottom screen 64 supports the media bed 66, allowing collection of filtered liquid in space 67, removed via outlet 68, and valve 70 connected to pump 72. Valve 74 is closed during filtration to direct clean liquid through a pipe 76 via open valve 78 to a point of system use.

Valve 102 is also closed at the time.

The separator element 82, constructed as in the above embodiment, is suspended in the tank 60 by a rotary shaft 86 driven by motor 88. A surrounding pipe 90 is received within a fitting 92 and collects flow passing into the interior of the separator element 82 during regeneration and directs the same to pipe 94.

An inlet pipe 96 and valve 98 are provided to controllably enable inflow of liquid to be filtered.

Facing agitator paddles 100 are attached to the lower end of the separator element 92 to be rotated therewith. It is noted that the paddles 100 could be oriented in other directions.

Rotation of the paddles 100 forms a slurry comprised of the media granules dispersed in the liquid in the tank 60. Valves 70 and 78 are closed, and valves 74 and 102 are opened so that pump 72 draws liquid into the interior of the rotating separator element 82 and into line 94 and out to line 104 for disposal.

FIG. 5 shows an alternate arrangement in which the outlet tubes 22A in the tank 12 also function as separator elements during regeneration. This is accomplished by drive means for rotating the tubes 22A, comprised of a drive motor and gear, belt, or chain drive train 106 causing rotation of all of the tubes 22A. Suitable bearing seal assemblies 108 are here necessary to support the tubes 22A for rotation and prevent leakage from the tank 60.

While a description of the separating process and apparatus has been given in the context of a filter, the invention may also be utilized in other contexts such as in deionizers, in which a rapidly moving screen can be used to allow a regeneration flow to pass over the resin beads. That is, an arrangement basically as shown in FIG. 1 can be used as a deionizer by using suitable resin beads, using the separator tube to allow a high volume backwash flow.

I claim:

1. A filtering process for removing contaminants suspended in a liquid to be filtered, comprising the steps of:
   disposing a mass of granular filter media in a tank so as to form a filter bed;
   passing liquid through said filter bed to remove said contaminants;
   collecting liquid passed through said bed and directing the same out of said tank for use;
   periodically interrupting filtering of said liquid to remove accumulated contaminants from said granular filter media, by a cleaning process comprising the steps of agitating liquid and filter media in said tank to form a mixture of liquid and dispersed filter media granules;
   circulating said mixture over a separator having flow openings sized smaller than the size of said filter media granules to prevent escape of filter media therethrough while allowing outflow of liquid and contaminants therethrough;
   drawing liquid and contaminants out of said tank through said separator while adding make-up liquid to said tank;
   drawing liquid and contaminants out through said separator openings;
   maintaining a substantially constant movement of said separator in said liquid filter media granule mixture to dislodge filter media granules drawn against said separator openings by a scrubbing action of said filter media granules dispersed in said liquid induced by movement of said separator through said mixture.

2. The filter process according to claim 1 wherein said filter openings comprise parallel slits and wherein said step of moving said separator, said separator is moved in a direction transverse to said slits to produce said scrubbing action.

3. The filter process according to claim 1 wherein said step of moving said separator comprises the step of rotating said separator about an axis.

4. The filter process according to claim 3 wherein said step of forming a liquid-filter media granule mixture comprises the step of mechanically agitating said mixture by moving an agitator element within said liquid to set up a circulation thereof.

5. The filter process according to claim 4 wherein said mechanical agitation step comprises the step of rotating a radial array of paddles within said liquid in said tank to create said mixture.

6. The filter process according to claim 5 further including the step of facing said paddles downwardly in said tank to cause a downward circulation of liquid into said filter bed upon rotation of said paddles.

7. The filter process according to claim 5 wherein said separator comprises a separator tube and wherein said separator tube is rotated in said step of rotating said separator.

8. The filter process according to claim 7 wherein said paddles are attached to said separator tube and said step of moving said separator and agitating said mixture are carried out simultaneously by rotation of said separator tube and paddles to carry out mechanical agitation, mixing, and circulation of said liquid and filter media granules and scrubbing of said separator openings.

9. A process for regenerating a liquid treatment granular media disposed in a tank by removing accumulated contaminants from a mass of granular media, said granular media being of a size on the order of 0.005 inches in diameter or larger, said process including the step of separating said granular media from the treated liquid in said tank, said separating step comprising the steps of:
   dispersing said mass of granular media in said tank in which said liquid treatment is carried out into said treated liquid to form a slurry disposed in said tank;
   drawing said liquid out of said tank through a separator element against which said slurry is circulated, said separator element framed with flow openings of a smaller size than the granules making up said mass of granular media to prevent escape of said granular media; and
   continuously rotating said separator element through said slurry while drawing off said liquid from said liquid treatment tank, said continuous rotating of said separator element is carried out so as to dislodge any granular media granules drawn to said openings to said separator element by impacting granules drawn to said openings with other granules in said slurry by rotating movement of said separator element therein, whereby said mass of granular media is regenerated by carrying off contaminants smaller sized than said granular media with said drawing off of said treated liquid from said liquid treatment tank.

10. The process according to claim 9 wherein said step of dispersing said granular media includes the step of mechanically agitating said liquid and granular media in said liquid treatment tank.

11. The process according to claim 10 wherein said mechanical agitation step comprises the step of rotating one or more agitator elements in said liquid.

12. The process according to claim 11 wherein in said steps of rotating said agitator element and separator element are carried out together simultaneously.

* * * * *

UNITED STATES PATENT AND TRADEMARK OFFICE
CERTIFICATE OF CORRECTION

PATENT NO. : 5,290,458

DATED : March 1, 1994

INVENTOR(S) : Jack R. Bratten

It is certified that error appears in the above-indentified patent and that said Letters Patent is hereby corrected as shown below:

Col. 4, line 58, after "58" insert --.--.

Col. 6, line 54, delete "framed" and insert --formed--.

Col. 6, line 63, delete "to" and insert --of--.

Signed and Sealed this

Twenty-seventh Day of September, 1994

Attest:

BRUCE LEHMAN

*Attesting Officer*       *Commissioner of Patents and Trademarks*